(12) United States Patent
Gwon et al.

(10) Patent No.: US 11,364,880 B2
(45) Date of Patent: Jun. 21, 2022

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Suhak Gwon, Gyeongju-si (KR); June Soo Park, Seoul (KR); Byung Seob Yu, Osan-si (KR); Ill Soo Kim, Suwon-si (KR); Jae Hong Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 99 days.

(21) Appl. No.: 16/916,879

(22) Filed: Jun. 30, 2020

(65) Prior Publication Data

US 2021/0170994 A1 Jun. 10, 2021

(30) Foreign Application Priority Data

Dec. 6, 2019 (KR) .................. 10-2019-0161634

(51) Int. Cl.
*B60S 1/48* (2006.01)
*B60S 1/54* (2006.01)
*B60W 60/00* (2020.01)
*B60W 50/14* (2020.01)

(52) U.S. Cl.
CPC .............. *B60S 1/481* (2013.01); *B60S 1/54* (2013.01); *B60W 50/14* (2013.01); *B60W 60/0025* (2020.02); *B60W 2420/52* (2013.01)

(58) Field of Classification Search
None
See application file for complete search history.

(56) References Cited

U.S. PATENT DOCUMENTS

| 10,173,646 | B1* | 1/2019 | Rice | ........................ B60S 1/485 |
| 2018/0118172 | A1* | 5/2018 | Dallos, Jr. et al. | |
| 2019/0322245 | A1* | 10/2019 | Kline | ........................ B60S 1/486 |
| 2020/0110407 | A1* | 4/2020 | Miura et al. | |
| 2020/0406864 | A1* | 12/2020 | Sakai | ........................ B60S 1/56 |
| 2021/0031727 | A1* | 2/2021 | Sakai et al. | |
| 2021/0197769 | A1* | 7/2021 | Shirakura et al. | |

\* cited by examiner

*Primary Examiner* — Fadey S. Jabr
*Assistant Examiner* — Mario C Gonzalez
(74) *Attorney, Agent, or Firm* — Morgan, Lewis & Bockius LLP

(57) ABSTRACT

A vehicle which contributes to safe autonomous driving by washing the sensor provided in the vehicle by efficiently using a limited capacity washing solution, and a control method thereof. The vehicle includes: a first sensor; a second sensor; a driving device including at least one motor and configured to operate to clean the first sensor and the second sensor; and a controller configured to control the driving device to first wash the first sensor prior to the second sensor based on predetermined rank information when is the controller determines that at least one of the first sensor and the second sensor is contaminated.

18 Claims, 9 Drawing Sheets

VEHICLE AND CONTROL METHOD THEREOF

CROSS-REFERENCE TO RELATED APPLICATION

The present application is based on and claims the benefit of priority to Korean Patent Application No. 10-2019-0161634, filed on Dec. 6, 2019 in the Korean Intellectual Property Office, the entire disclosure of which is incorporated herein by reference.

TECHNICAL FIELD

The disclosure relates to a vehicle including a washing device, and a control method thereof.

BACKGROUND

In general, the washing device of the vehicle is installed in the front bumper of the vehicle to perform an operation of cleaning and removing foreign matter from the vehicle.

In this case, the radar or the rider is a sensor for detecting an obstacle in front of the vehicle, which is an essential configuration of the autonomous vehicle.

Therefore, if foreign matter gets on the surface of the radar or LIDAR during driving and the sensor cannot identify the obstacle in front of the vehicle, the vehicle cannot obtain the obstacle information, which increases the risk of accidents during autonomous driving.

To this end, a washing device for cleaning the surface of the radar or LIDAR may be mounted on the vehicle.

On the other hand, considering the fuel consumption, the wash liquid that can be accommodated by the vehicle is limited, it is necessary to develop a system for cleaning when the radar or LIDAR sensor are contaminated.

The information disclosed in the Background section above is to aid in the understanding of the background of the present disclosure, and should not be taken as acknowledgement that this information forms any part of prior art.

SUMMARY

Therefore, it is an aspect of the disclosure to provide a vehicle which contribute to safe autonomous driving by washing the sensor provided in the vehicle by efficiently using a limited capacity washing solution, and a control method thereof.

In accordance with one aspect of the disclosure, a vehicle includes: a first sensor; a second sensor; a driving device including at least one motor and configured to operate to clean the first sensor and the second sensor; and a controller configured to control the driving device to first wash the first sensor prior to the second sensor based on predetermined rank information when the controller determines that at least one of the first sensor and the second sensor is contaminated.

The controller may be further configured to control to sequentially wash the first sensor and the second sensor.

The controller may be further configured to change an output of the driving device based on velocity information of the vehicle.

The controller may be further configured to obtain remaining amount information of a washing solution disposed in the vehicle and to control the driving device to spray the washing solution or pressurized air on at least one of the first sensor and the second sensor based on the remaining amount information.

The controller may be further configured to obtain contamination information of the first sensor and the second sensor from the first sensor and the second sensor, respectively, and to change an output of the driving device based on the contamination information.

The output of the driving device may include spraying pressure and spraying time of the washing solution that the driving device sprays on at least one of the first sensor and the second sensor.

Each of the first sensor and the second sensor may include a plurality of sensor modules arranged at different positions of the vehicle, and the controller may be further configured to obtain contamination information of each of the plurality of sensor modules and to change an output of the driving device based on the contamination information of each of the plurality of sensor modules and location information of each of the plurality of sensor modules.

The vehicle may further include: a display, and the controller may be further configured to output contamination information to the display.

The controller, when a number of times of washing of at least one of the first sensor and the second sensor increases, may be further configured to increase an output of the driving device in response to the number of times of washing.

The first sensor may include a LIDAR sensor and the second sensor may include a radar sensor.

In accordance with another aspect of the disclosure, a control method of a vehicle, include: determining whether at least one of a first sensor and a second sensor is contaminated; and controlling a driving device to first wash the first sensor prior to the second sensor based on predetermined rank information when it is determined that the at least one of the first sensor and the second sensor is contaminated.

The controlling a driving device to first wash the first sensor prior to the second sensor may include: controlling the driving device to sequentially wash the first sensor and the second sensor.

The controlling a driving device to first wash the first sensor prior to the second sensor may include: changing an output of the driving device based on velocity information of the vehicle.

The control method may further include: obtaining remaining amount information of a washing solution disposed in the vehicle, and the controlling a driving device to first wash the first sensor prior to the second sensor may include: controlling the driving device to spray the washing solution or pressurized air on at least one of the first sensor and the second sensor based on the remaining amount information.

The control method may further include: obtaining contamination information of the first sensor and the second sensor from the first sensor and the second sensor, respectively, and the controlling a driving device to first wash the first sensor prior to the second sensor may include: changing an output of the driving device based on the contamination information.

The output of the driving device may include spraying pressure and spraying time of the washing solution that the driving device sprays on at least one of the first sensor and the second sensor.

Each of the first sensor and the second sensor may include a plurality of sensor modules arranged at different positions of the vehicle, and the control method may further include: obtaining contamination information of each of the plurality of sensor modules; and changing the output of the driving device based on the contamination information of each of the plurality of sensor modules and location information of each of the plurality of sensor modules.

The control method may further include: outputting contamination information to a display.

The controlling a driving device to first wash the first sensor prior to the second sensor may include: when a number of times of washing of at least one of the first sensor and the second sensor increases, increasing an output of the driving device in response to the number of times of washing.

The first sensor may include a LIDAR sensor and the second sensor may include a radar sensor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the disclosure will be described with reference to the accompanying drawings.

Figure 1:
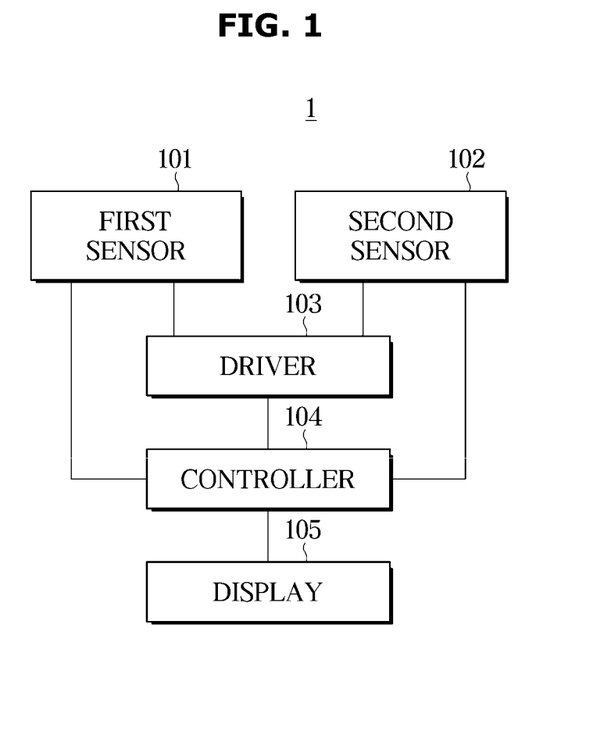
FIG. 1 is a control block diagram of a vehicle according to an exemplary embodiment of the disclosure.
Figure 2:
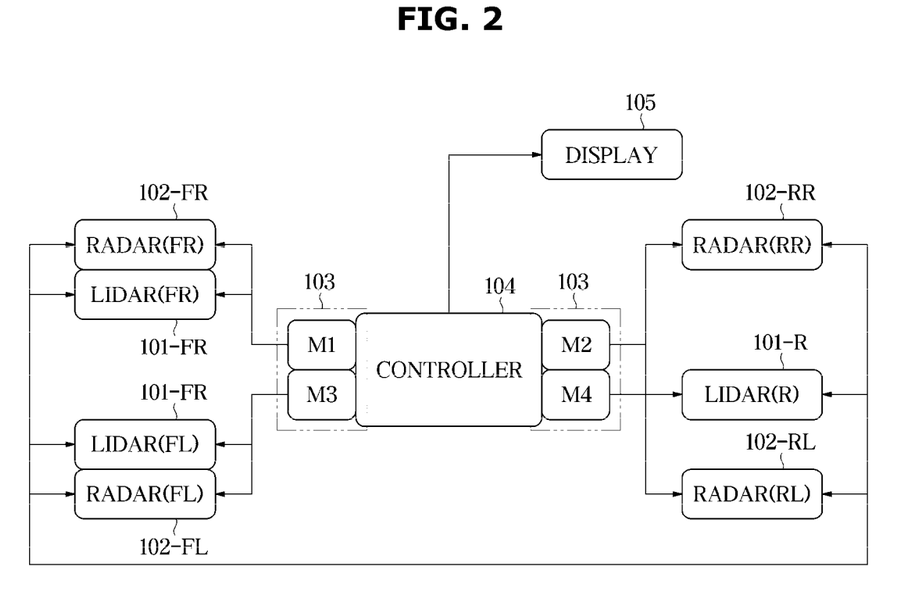
FIG. 2 is a diagram illustrating a connection relationship between a vehicle configuration according to an exemplary embodiment of the disclosure.

FIG. 1 is a control block diagram of a vehicle according to an exemplary embodiment of the disclosure. FIG. 2 is a diagram illustrating a connection relationship between a vehicle configuration according to an exemplary embodiment of the disclosure.

Referring to FIG. 1, a vehicle according to an exemplary embodiment may include a first sensor 101, a second sensor 101, a driving device 103, a display 105, and a controller 104.

The first sensor 101 and the second sensor 102 may be provided to detect an obstacle around the vehicle.

In detail, the first sensor 101 may be provided as a LIDAR, and the second sensor 102 may be provided as a radar.

The first sensor may include a plurality of LIDAR sensors (101-FR, 101-FL).

The LIDAR sensors (101-FR, 101-R) may refer to a sensor that accurately depicts the surroundings by emitting a laser pulse, receiving the light reflected from the surrounding object, and measuring the distance to the object.

The second sensor may include a plurality of radar sensors.

Radar (102-FR, 102-FL, 102-RR. 102-RL) may refer to a sensor that detects a distance, a direction, an altitude, etc. from the object by emitting an electromagnetic wave of microwave (ultra high frequency, 10 cm~100 cm wavelength) to the object and receiving the electromagnetic wave reflected from the object.

The driving device 103 may be provided to wash the first sensor and the second sensor.

In detail, the driving device 103 may include motors M1, M2, M3, and M4 spraying the washing solution provided in the vehicle to the first sensor and the second sensor.

When it is determined that at least one of the first sensor and the second sensor is contaminated, the controller 104 may control the driving device to wash the first sensor prior to the second sensor based on predetermined rank information.

The rank information may be set to wash the LIDAR prior to the radar because the LIDAR has a higher accuracy than the radar.

The controller 104 may control to sequentially wash the first sensor and the second sensor. Washing sequentially may mean not washing simultaneously.

When the controller 104 washes the first sensor and the second sensor at the same time, a shadow area may occur and an unsensing area may occur. To prevent this, the controller may control the driving device not to wash the first sensor and the second sensor at the same time.

The controller 104 may change the output of the driving device based on the velocity information of the vehicle. Specifically, the driving device may output the spraying pressure and the spraying amount outputting the washing solution in proportion to the vehicle velocity.

The controller 104 may obtain remaining amount information of the washing solution provided in the vehicle, and spray the washing solution or air pressure to at least one of the first sensor and the second sensor based on the remaining amount information. That is, when the remaining amount of the washing solution in the vehicle is small, spraying the washing solution is not efficient, so the controller may control the driving device to spray air pressure.

The controller 104 may obtain contamination information of each of the first sensor and the second sensor from each of the first sensor and the second sensor.

The contamination information may include the amount of foreign matter in the presence of foreign matter in each sensor.

The controller 104 may change the output of the driving device based on contamination information. Specifically, when the amount of foreign matter is large, the driving device output may be increased, and when the amount of foreign matter is small, the driving device output may be reduced.

The output of the driving device 103 may include a spraying pressure and a spraying time of the washing solution sprayed by the driving device.

Meanwhile, as described above, each of the first sensor 101 and the second sensor 102 may include a plurality of sensor modules arranged at different positions of the vehicle.

According to an exemplary embodiment of the disclosure, the first sensor may include a LIDAR sensor. The LIDAR sensor may include a LIDAR sensor module 101-FR provided at the front and a LIDAR sensor module 101-RR provided at the rear.

According to an exemplary embodiment of the disclosure, the second sensor 102 may include a radar sensor. The radar sensor may include a radar sensor module 102-FR provided in the front right side, a radar sensor module 102-FL provided in the front left side, and a radar sensor module 102-RR and 102-RL provided in the rear.

On the other hand, the number of the sensor module described herein and the position of each sensor module is only an exemplary embodiment of the disclosure and there is no limitation thereto.

The controller may obtain contamination information of each of the plurality of sensor modules.

The controller may change the output of the driving device based on contamination information of each of the plurality of sensor modules and location information of each of the plurality of sensor modules.

For example, when contamination occurs in the front LIDAR sensor module 101-FL or 101-FR among a plurality of modules included in the same first sensor 101, the controller may control the driving device so that the front rider sensor modules 101-FL and 101-FR are washed.

In addition, the controller may give priority to each of the plurality of sensor modules included in each sensor.

For example, when the vehicle is traveling at a high speed, the sensor in front of the vehicle has a great influence on the driving, so even if contamination occurs in the rear LIDAR sensor module 101-R and the rear radar sensor module 102-R, the controller may control the driving device to wash the LIDAR sensor modules 101-FL and 101-FR and the radar sensor modules 102-FR and 101-FL located in front prior to the rear LIDAR and radar sensor modules.

In addition, the controller 104 may output contamination information to the display.

The display 105 is configured to output a screen, which may be provided as a Cathode Ray Tube (CRT), Digital Light Processing (DLP) panel, Plasma Display Panel (PDP), Liquid Crystal Display (LCD) panel, Electro Luminescence (EL) panel, Electrophoretic Display (EPD) panel, Electrochromic Display (ECD) panel, Light Emitting Diode (LED) panel, or Organic Light Emitting Diode (OLED) panel, etc., but is not limited thereto.

When the number of times of washing increases, the controller 104 may increase the output of the driving device in response to the number of times of washing. That is, the increase in the number of times of washing is because the foreign matter of the sensor has not been removed, and when the number of times of washing increases, the controller may wash the sensor by increasing the output value of the driving device.

On the other hand, the motor provided in the driving device 103 is capable of bidirectional control to wash the two sensors, each configuration can be connected via a hose and a CAN network as shown in FIG. 2. In addition, although not shown, the controller may include a washing integrated controller and a micro controller unit (MCU).

The controller 104 may be implemented in a memory (not shown) that stores data for an algorithm or a program that reproduces the algorithm for controlling the operation of components in the vehicle, and a processor (not shown) that performs the above-described operation using the data stored in the memory. In this case, the memory and the processor may be implemented as separate chips. Alternatively, the memory and the processor may be implemented in a single chip.

At least one component may be added or removed to correspond to the performance of the components of the vehicle illustrated in FIGS. 1 and 2. In addition, it will be readily understood by those skilled in the art that the mutual position of the components may be changed corresponding to the performance or structure of the system.

Each component shown in FIGS. 1 and 2 refers to software and/or hardware components such as Field Programmable Gate Array (FPGA) and Application Specific Integrated Circuit (ASIC).

Figure 3:
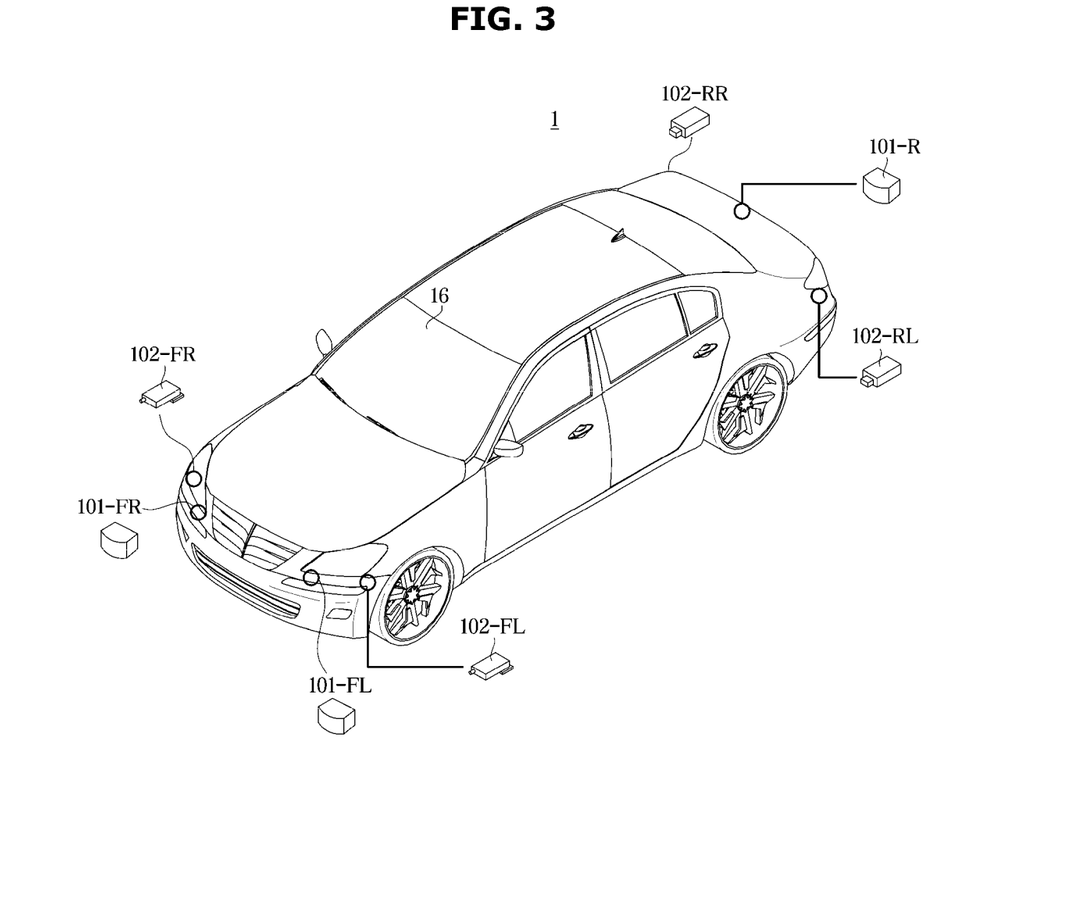
FIG. 3 is a diagram illustrating a first sensor and a second sensor according to an exemplary embodiment of the disclosure.
Figure 4A:
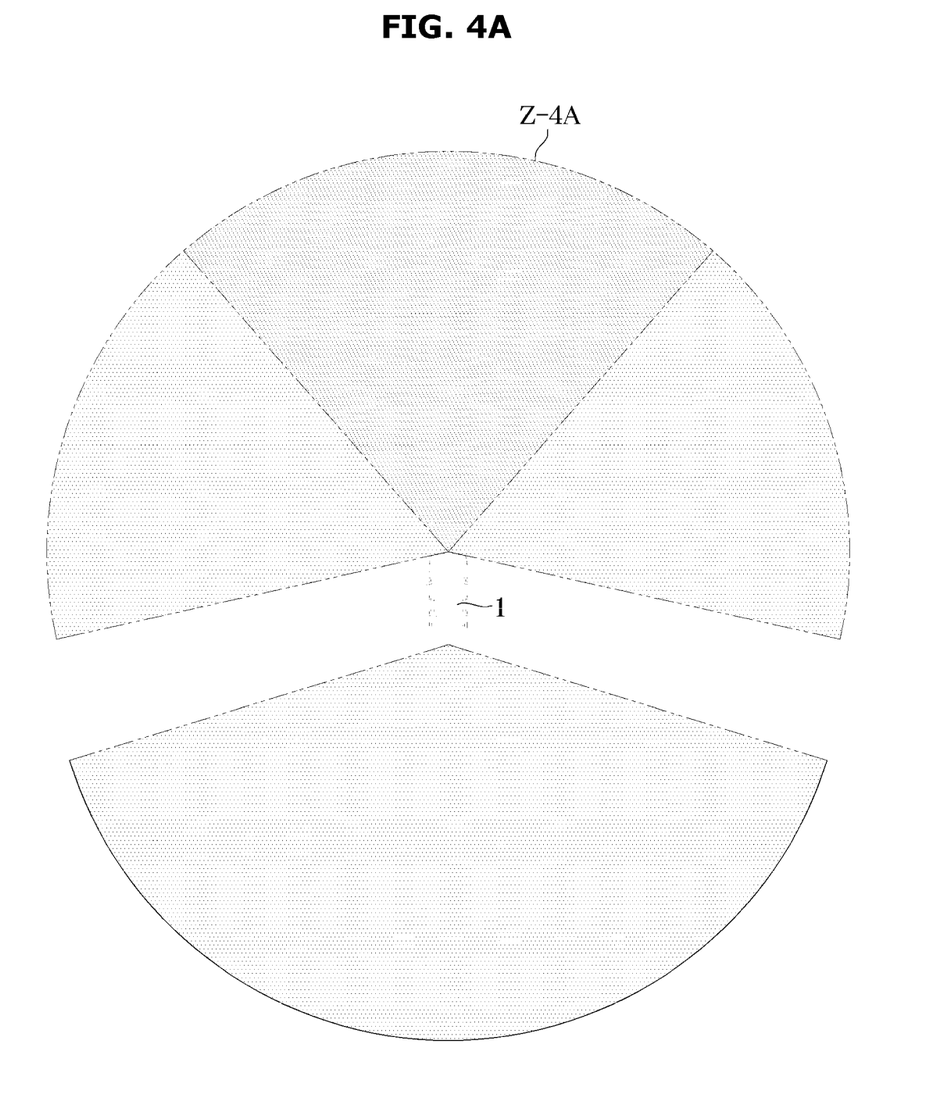
FIGS. 4A and 4B are diagrams for illustrating an operation of a first sensor and a second sensor according to an exemplary embodiment of the disclosure.
Figure 4B:
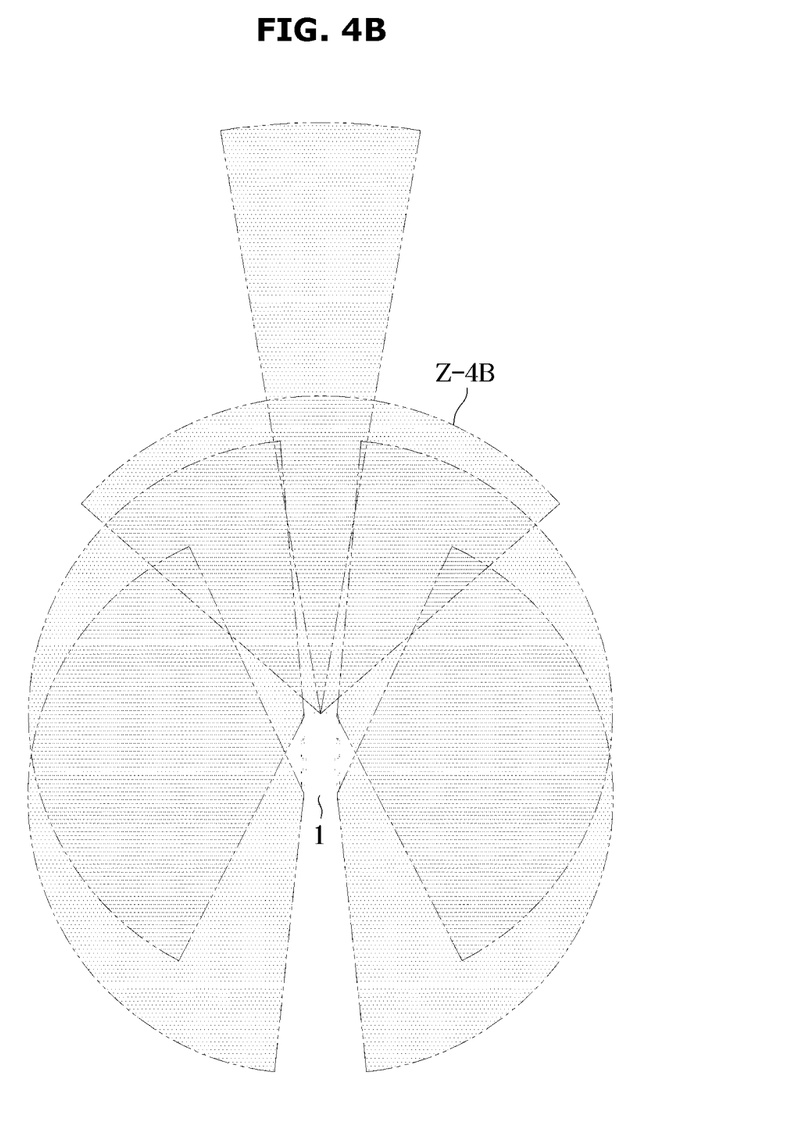

FIG. 3 is a diagram illustrating a first sensor and a second sensor according to an embodiment of the disclosure. FIGS. 4A and 4B are diagrams for illustrating an operation of a first sensor and a second sensor according to an embodiment of the disclosure.

Referring to FIGS. 3 and 4A, the first sensor may include a front LIDAR 101-F and a rear LIDAR 101-RR. In particular, FIG. 4A shows a range Z-4a in which such LIDAR obtains positional information around the vehicle.

The LIDAR may precisely obtain the moving speed and direction as well as the distance to the target object.

In addition, in order for an autonomous vehicle to drive itself, it must be able to recognize the surrounding environment and perform location recognition, mapping, etc., just as a driver of a vehicle looks around and drives the vehicle. A LIDAR may play that role.

Referring to FIGS. 3 and 4B, the second sensor may include a front radar 102-FR, a front side radar 102-FL, and a rear side radar 102-R.

As shown in FIG. 4B, the radar may detect a wider range of objects than the LIDAR. In particular, the radar may be provided with a front radar to detect an obstacle in a wider front region (Z-4b).

Referring to FIGS. 4A and 4B, the controller may determine the priority between the first sensor including the LIDAR and the second sensor including the radar. According to an exemplary embodiment, the accuracy of the sensor is determined to be an important factor in autonomous driving, and the controller may determine the first sensor including the LIDAR to have a higher priority than the second sensor.

For example, when contamination occurs in the first sensor and the second sensor, the controller may perform washing of the first sensor prior to washing of the second sensor to remove contamination of the first sensor.

On the other hand, the operation shown in FIGS. 3, 4a and 4b is only one exemplary embodiment for describing the operation of the disclosure and there is no limitation of the operation for washing the sensor.

Figure 5:
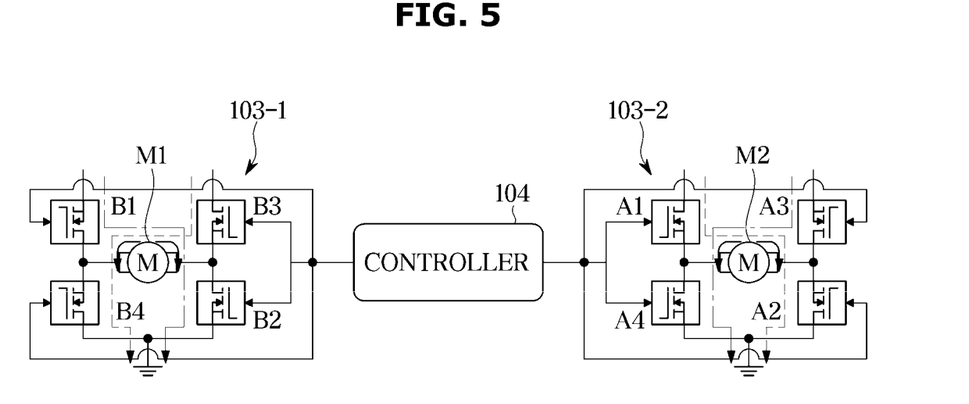
FIG. 5 is a diagram for illustrating an operation of controlling a driving device by a controller according to an exemplary embodiment of the disclosure.
Figure 6:
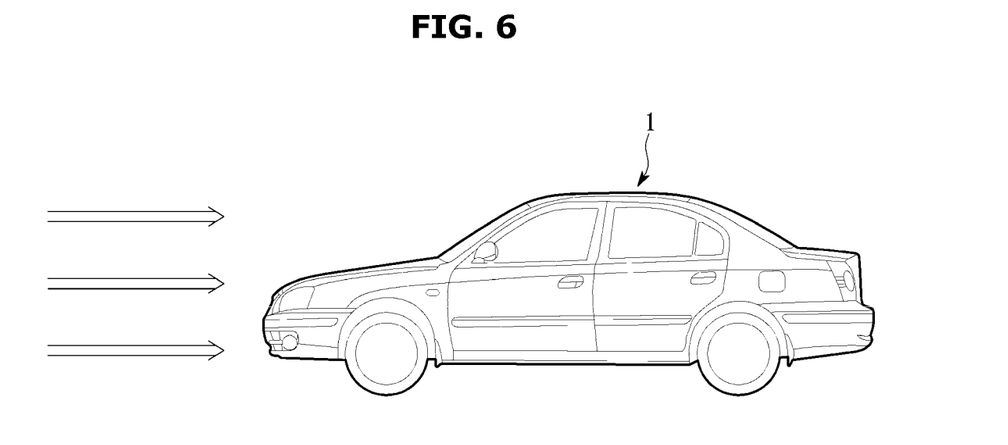
FIG. 6 is a diagram for illustrating a situation of controlling a driving device by a controller according to an exemplary embodiment of the disclosure.

FIG. 5 is a diagram for illustrating an operation of controlling a driving device by a controller according to an exemplary embodiment of the disclosure. FIG. 6 is a diagram for illustrating a situation of controlling a driving device by a controller according to an exemplary embodiment of the disclosure.

Referring to FIG. 5, the driving device may include motors M1 and M2.

The motor included in the driving device may spray a two-sensor washing solution. In more detail, the driving device may implement forward or reverse rotation of the motor by using the circuit shown in FIG. 5. The driving device may use an H-Bridge FET circuit as shown in FIG. 5.

On the other hand, the controller may adjust the motor RPM using PWM (Pulse width modulation) control. The controller may change the output of the driving device based on the velocity information of the vehicle.

Referring to FIGS. 5 and 6, the controller may adjust the motor RPM according to the speed section information.

For example, the controller may increase motor RPM because the vehicle needs a higher spraying pressure to withstand air resistance at high speeds.

On the other hand, the controller may utilize washing solution efficiently by utilizing spraying pressure lower than high speed at low speed.

The controller may obtain contamination information of each of the first sensor and the second sensor from each of the first sensor and the second sensor.

The contamination information may mean information for determining how many foreign matters exist in each sensor.

The controller may adjust the spraying pressure and the spraying time of the washing solution according to contamination information.

Specifically, strong spraying pressure is required when contamination information is high.

The controller may control the driving device to spray the washing solution with a strong spraying pressure. On the other hand, when the contamination information is low, high spraying pressure is not necessary. The controller may reduce the amount of washing solution by utilizing low spraying pressure and may effectively remove the contamination of the sensor.

In addition, the controller may adjust the washing solution spraying time according to the contamination amount of contamination information.

The controller may increase the spraying time by controlling the driving device in case of high contamination. On the other hand, the controller may reduce the amount of washing solution through lower spraying times for low contamination.

The controller may increase the output of the driving device in response to the number of times of washing when the number of times of washing of at least one of the first sensor and the second sensor increases.

Specifically, the controller may control the spraying pressure and the spraying time when the contamination is not completely removed from the sensor after the first washing.

Specifically, the controller may raise the motor RPM for re-requests immediately after decontamination attempts. The controller may also adjust the washing solution spraying time for re-requests immediately after decontamination attempts.

On the other hand, the operations described in FIGS. 5 and 6 are only exemplary embodiments for describing the washing of the sensor of the disclosure and is not limited in its operation.

Figure 7:
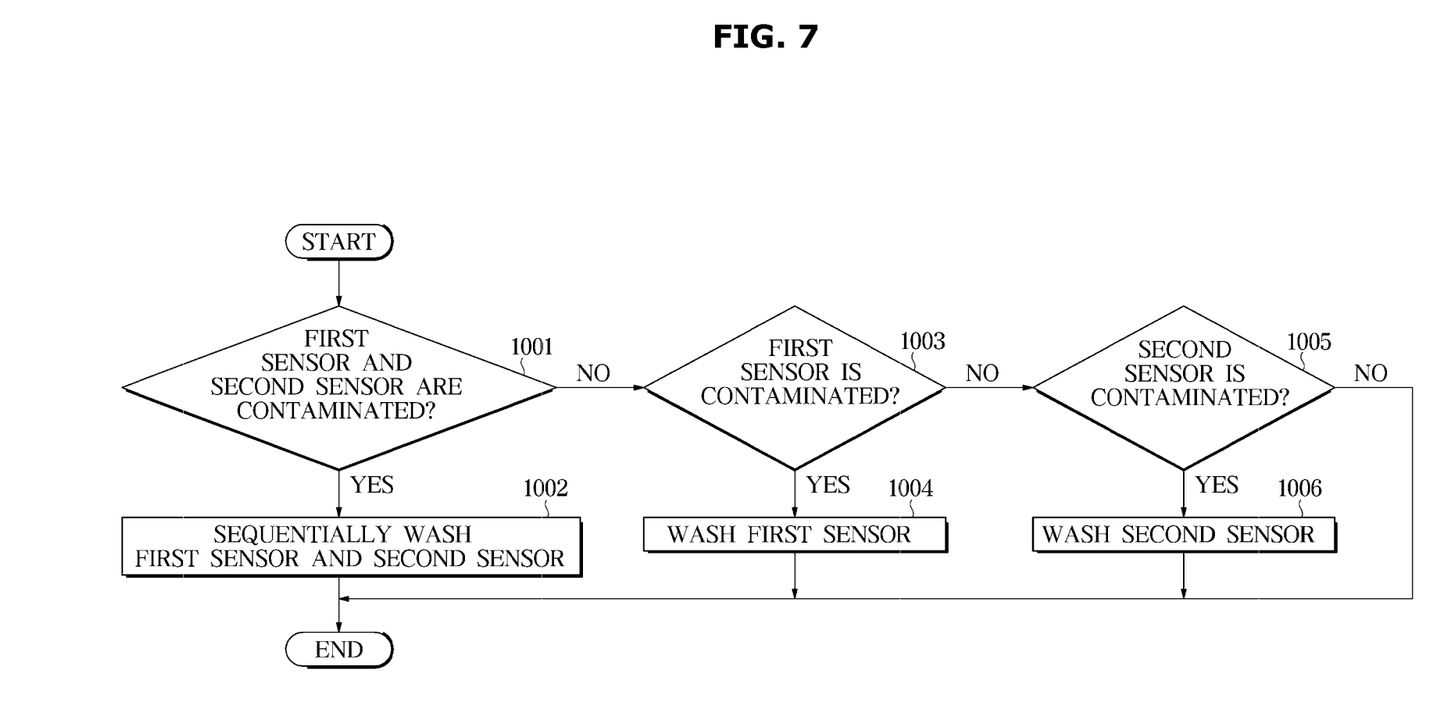
FIG. 7 is a flow chart according to an exemplary embodiment of the disclosure.
Figure 8:
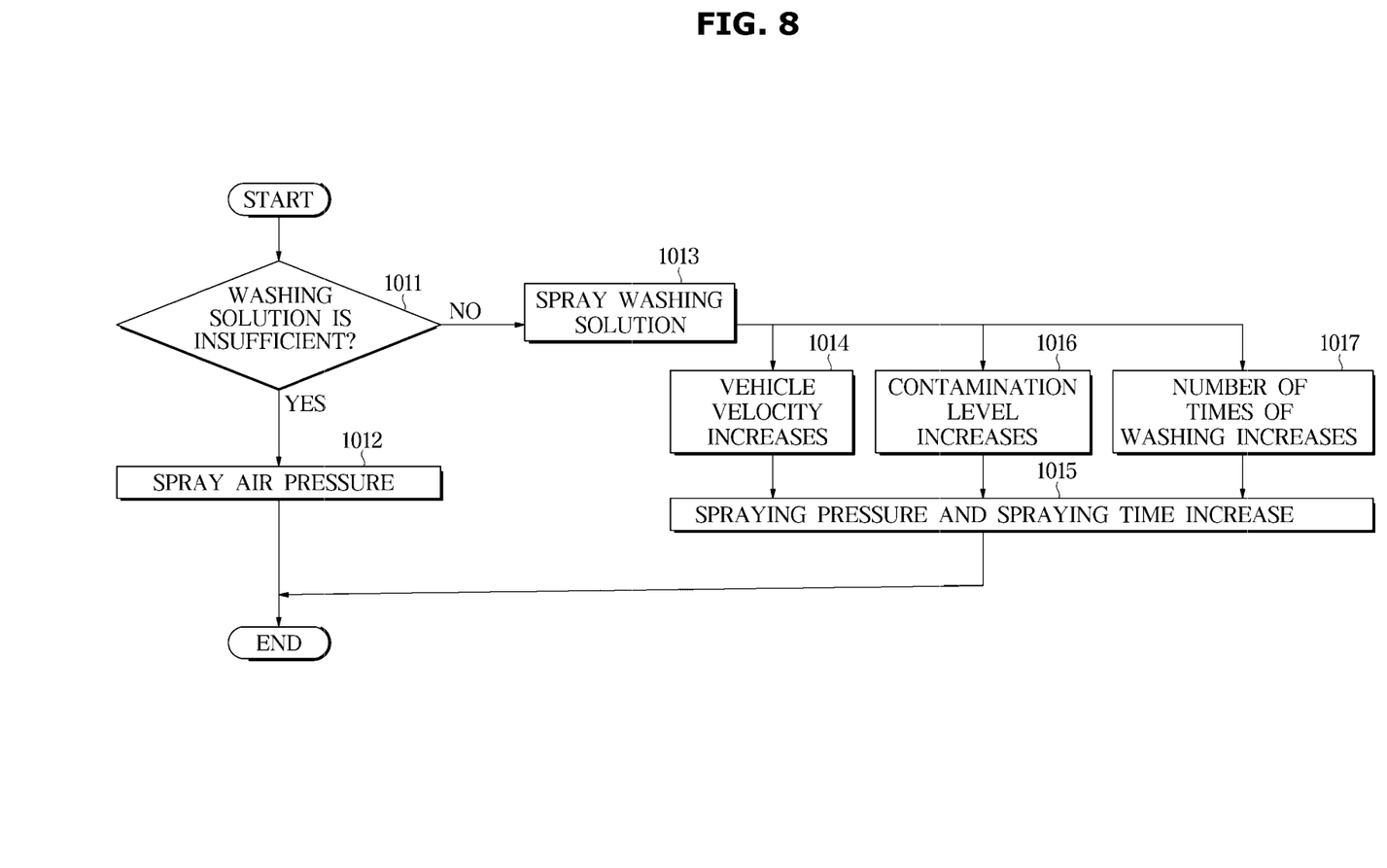
FIG. 8 is a flow chart according to an exemplary embodiment of the disclosure.

FIGS. 7 and 8 are a flow chart according to exemplary embodiments of the disclosure.

Referring to FIG. 7, the controller may determine whether the first sensor and the second sensor are contaminated (1001). When both the first sensor and the second sensor are contaminated, the first sensor and the second sensor may be sequentially washed (1002).

On the other hand, when only the first sensor is contaminated (1003), the controller may control to wash only the first sensor (1004). In addition, when only the second sensor is contaminated, the controller may wash the second sensor (1005, 1006).

FIG. 8 is a flowchart illustrating an operation of varying the spraying situation of the washing solution according to the situation.

When it is determined that the washing solution of the vehicle is insufficient (1011), the controller may spray air pressure to each sensor (1012). In addition, the controller may spray the washing solution in each sensor when the washing solution is not insufficient (1013).

However, when the vehicle velocity increases (1014), the contamination level of the sensor increases (1016) or the number of times of washing the sensor increases (1017), the controller may control the driving device to increase the spraying pressure and spraying time (1015).

A vehicle and a control method thereof according to an exemplary embodiment may contribute to safe autonomous driving by washing the sensor provided in the vehicle by efficiently using a limited capacity washing solution.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the disclosure have been described for illustrative purposes, those skilled in the art will appreciate that various modifications, additions and substitutions are possible, without departing from the scope and spirit of the disclosure. Therefore, exemplary embodiments of the disclosure have not been described for limiting purposes.

What is claimed is:

1. A vehicle comprising:
   a first sensor;
   a second sensor;
   a driving device including at least one motor and configured to operate to clean the first sensor and the second sensor;
   a controller configured to control the driving device to first wash the first sensor prior to the second sensor based on predetermined rank information when the controller determines that at least one of the first sensor and the second sensor is contaminated,
   wherein the controller is further configured to, when a number of times of washing of at least one of the first sensor and the second sensor increases, increase an output of the driving device in response to the number of times of washing.

2. The vehicle according to claim 1, wherein the controller is further configured to control the driving device to sequentially wash the first sensor and the second sensor.

3. The vehicle according to claim 1, wherein the controller is further configured to change an output of the driving device based on velocity information of the vehicle.

4. The vehicle according to claim 1, wherein the controller is further configured to obtain remaining amount information of a washing solution disposed in the vehicle and to control the driving device to spray the washing solution or pressurized air on at least one of the first sensor and the second sensor based on the remaining amount information.

5. The vehicle according to claim 1, wherein the controller is further configured to obtain contamination information of the first sensor and the second sensor from the first sensor and the second sensor, respectively, and to change an output of the driving device based on the contamination information.

6. The vehicle according to claim 5, wherein the output of the driving device comprises spraying pressure and spraying time of the washing solution that the driving device sprays on at least one of the first sensor and the second sensor.

7. The vehicle according to claim 5, wherein each of the first sensor and the second sensor comprises a plurality of sensor modules arranged at different positions of the vehicle, and
   wherein the controller is further configured to obtain contamination information of each of the plurality of sensor modules and to change the output of the driving device based on the contamination information of each of the plurality of sensor modules and location information of each of the plurality of sensor modules.

8. The vehicle according to claim 1, further comprising:
   a display;
   wherein the controller is further configured to output contamination information to the display.

9. The vehicle according to claim 1, wherein the first sensor comprises a LIDAR sensor and the second sensor comprises a radar sensor.

10. A control method of a vehicle, comprising:
    determining whether at least one of a first sensor and a second sensor is contaminated; and
    controlling a driving device to first wash the first sensor prior to the second sensor based on predetermined rank information when it is determined that the at least one of the first sensor and the second sensor is contaminated,
    wherein the controlling a driving device to first wash the first sensor prior to the second sensor comprises
    when a number of times of washing of at least one of the first sensor and the second sensor increases, increasing an output of the driving device in response to the number of times of washing.

11. The control method according to claim 10, wherein the controlling a driving device to first wash the first sensor prior to the second sensor comprises controlling the driving device to sequentially wash the first sensor and the second sensor.

12. The control method according to claim 10, wherein the controlling a driving device to first wash the first sensor prior to the second sensor comprises changing an output of the driving device based on velocity information of the vehicle.

13. The control method according to claim 10, further comprising
    obtaining remaining amount information of a washing solution disposed in the vehicle,
    wherein the controlling a driving device to first wash the first sensor prior to the second sensor comprises:
    controlling the driving device to spray the washing solution or pressurized air on at least one of the first sensor and the second sensor based on the remaining amount information.

14. The control method according to claim 10, further comprising
    obtaining contamination information of the first sensor and the second sensor from the first sensor and the second sensor, respectively,
    wherein the controlling a driving device to first wash the first sensor prior to the second sensor comprises
    changing an output of the driving device based on the contamination information.

15. The control method according to claim 14, wherein the output of the driving device comprises spraying pressure and spraying time of the washing solution that the driving device sprays on at least one of the first sensor and the second sensor.

16. The control method according to claim 15, wherein each of the first sensor and the second sensor comprises a plurality of sensor modules arranged at different positions of the vehicle, and
    wherein the control method further comprises:
    obtaining contamination information of each of the plurality of sensor modules; and
    changing the output of the driving device based on the contamination information of each of the plurality of sensor modules and location information of each of the plurality of sensor modules.

17. The control method according to claim 10, further comprising
    outputting contamination information to a display.

18. The control method according to claim 10, wherein the first sensor comprises a LIDAR sensor and the second sensor comprises a radar sensor.

* * * * *